May 21, 1963 D. R. SEYMOUR ETAL 3,090,516
PANEL HANDLING AND TRANSPORTING MACHINES
Filed June 16, 1961 3 Sheets-Sheet 1

INVENTOR
D. R. Seymour
Thomas F. Roe
Henry Heyman

May 21, 1963 D. R. SEYMOUR ETAL 3,090,516
PANEL HANDLING AND TRANSPORTING MACHINES
Filed June 16, 1961 3 Sheets-Sheet 2
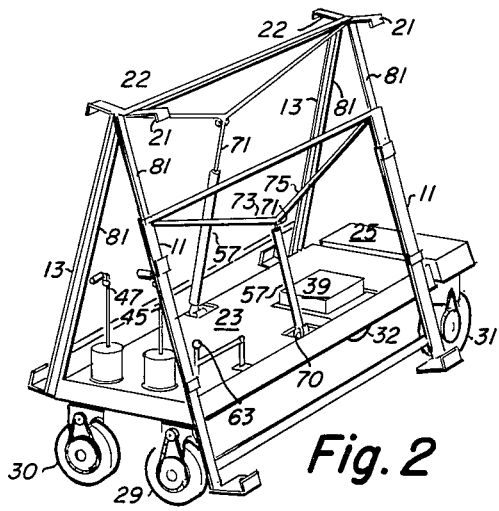
Fig. 2
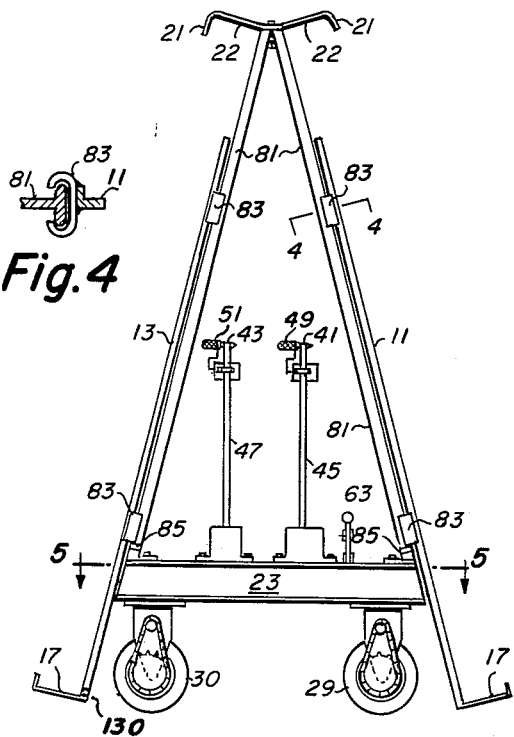
Fig. 4
Fig. 3
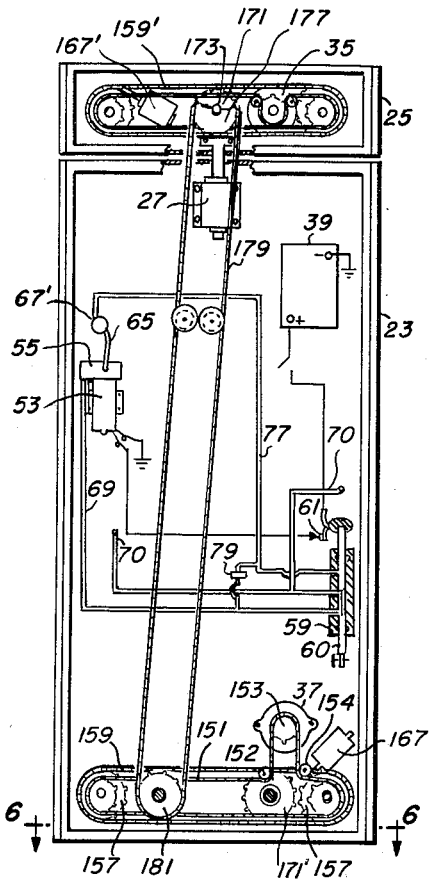
Fig. 5
INVENTOR
Dale R. Seymour
Thomas H. Boe
Henry Heyman May 21, 1963   D. R. SEYMOUR ETAL   3,090,516
PANEL HANDLING AND TRANSPORTING MACHINES
Filed June 16, 1961   3 Sheets-Sheet 3

INVENTOR
Dale R. Seymour
Thomas J. Boe
Henry Heyman

United States Patent Office 3,090,516
Patented May 21, 1963

3,090,516
PANEL HANDLING AND TRANSPORTING
MACHINES
Dale R. Seymour and Thomas F. Poe, Albuquerque, and
Henry Heyman, Pojoaque, N. Mex.; said Heyman assignor to said Seymour and said Poe
Filed June 16, 1961, Ser. No. 117,655
7 Claims. (Cl. 214—654)

This invention relates to machines for transporting construction panels and more particularly to a machine for lifting and transporting building panels from the delivering truck to and into a building under construction.

Modern building construction, more and more utilizes large units of material in order to reduce the time and labor consumed in erecting and finishing buildings such as, for example, houses, dwellings, apartment houses, offices, etc. One example of this trend is the utilization of large prefabricated plaster or wood panels. These panels range in size from 4 by 8 feet to as large as 4 feet by 16 feet. In the present state of the art, difficulties arise in handling panels of such ungainly size and fragile nature. At least two handlers are required to transport the panels from the delivery truck to and into the building under construction. This results in the unnecessary expense and waste of time of at least one of the handlers who must accompany the driver of the delivering truck simply to be present to unload the cargo. Frequently, the delivering time is far in excess of the time required for unloading, thereby putting the ultimate building owner to unwarranted increased expense resulting from the inefficiency of the method.

It is a prime purpose of the present invention to provide a portable machine which will be transported on the delivering truck and which will, under the control of a single handler, conveniently and safely pick up the building panels from the truck and carry them into the building under construction.

It is contemplated that the buliding panels will be supported upright on the truck, resting on an edge elevated a few inches from the floor of the truck by suitable blocks or sleepers. This stack of panels may consist of several bundles and be as much as about two feet thick, and two such stacks can be carried on a standard flat bed motor truck, one on each side of the flat bed, thereby leaving a two foot corridor between the opposed surfaces of the bundles. The machine of the present invention will be transported on the truck bed in the corridor between the stacks and during the unloading process will proceed to pick up and transport a plurality of the panels from the stacks on one or both sides and carry them down a ramp and into the building.

A machine for the purpose must be characterized by the utmost flexibility in maneuverability. For example, it has to be able to pass through the entrance doorway of a building and be able to negotiate turns from one intersecting hallway into another. It must have sufficient traction to negotiate a steep incline into the building occasioned by the provision of planks over the entrance steps.

The machine of the present invention solves these requirements by providing lifting racks for the panels, independent fore and aft driving wheels, and independent fore and aft steering controls.

The manner in which the aforegoing objectives and accomplishments are obtained will become apparent from reading the following specification taken with the drawing made a part of this specification.

FIGURE 2 is a perspective view of the portable transport vehicle.

FIGURE 3 is a vertical rear view of the vehicle.

FIGURE 4 is a detail on plane 4—4 of FIGURE 3.

FIGURE 5 is a horizontal cross-sectional view on plane 5—5 of FIGURE 3.

FIGURE 6 is a vertical cross section on plane 6—6 of FIGURE 5.

FIGURE 7 is a detail cross section of a wheel mounting.

FIGURE 8 is a detailed showing of the transmission mechanism of the drive motor and rear wheel sprockets.

Figure 1:
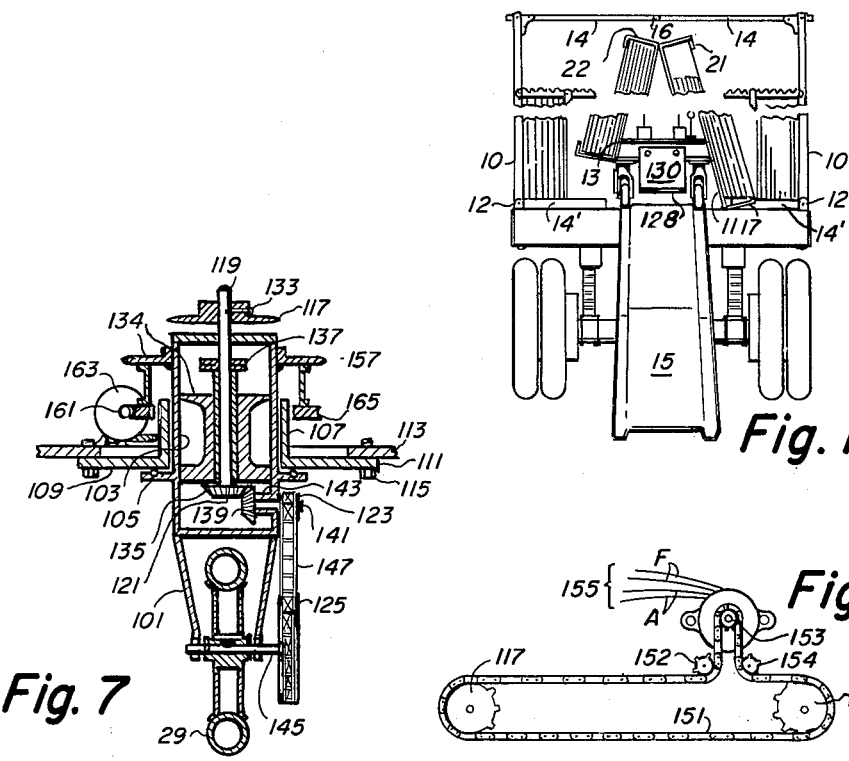
FIGURE 1 is a rear view of a freight delivery vehicle loaded with a panel cargo and the transport vehicle of the present invention in operative position on said freight delivery vehicle.

Referring to FIGURE 1, the utilization of the transport vehicle of the present invention is shown in its preferred mode of application.

The vehicle is adapted to be carried on the floor of a freight truck or car in the aisle between two vertical stacks of construction panels. It is adapted to move transversely to pick up a supply of panels on at least one and preferably two racks 11 and 13. After the racks are loaded, the racks are raised, the wheels are turned to the fore and aft direction and the vehicle is driven down ramp 15 and to and into the building under construction. The flat bed of a truck is commonly six feet wide and with the transport vehicle of the present invention having a width preferably not in excess of two feet, a space remains on the truck for the cargo of approximately four feet. The width of the transport vehicle of this invention is preferably not in excess of two feet in order that building doorways having a width of 30 inches be negotiated.

It is contemplated that for greatest efficiency in handling building material that the side stake frames 10 of the delivery truck will be pivoted as at 12. The side stakes will be supported in horizontal position on pivoted brace arms 14 which will be swung outwardly at right angles of stakes 10 to assume a vertical position beneath the ends of the stakes. The building panels will be laid on the side stakes by the usual fork pick-up truck. The fork-truck will then back off, insert the fork under the side stake frames and raise the stakes into vertical position. Brace arms 14 are then rotated inwardly and locked together as at 16 to render the cargo secure.

Ramp 15 is of portable extensible type and preferably is fabricated of light high strength material such as aluminum or magnesium. Its upper end can be provided with a down-turned flange (not shown) to engage a bracket affixed to the vertical surface of the rear end of the flat bed. When not in use, ramp 15 will be telescoped and stowed on the transport vehicle between racks 11 and 13.

The transport vehicle will normally carry its first load when the cargo is being delivered. This first load will be raised off sleepers 14' and the vehicle will be driven down ramp 15, dispose of the load and return. One or both of racks 11 or 13 are lowered, the drive wheels are rotated to a direction at right angles to the transport vehicle and the vehicle driven sideways so that foot piece 17 is moved under the lower edge of a selected number of panels. The upper edges of the panels are manually urged over to lie against the rack. The rack is then raised until the upper edge of the panels abut bracket 22 and are confined by bracket lip 21. The transport vehicle is next moved sideways toward the second group of panels and a second load may be taken on.

The transport vehicle of this invention is now described with reference to FIGURES 2 and 5. It is a structure having a bed or frame in two parts, a main frame member 23 and a short frame member 25. Frame member 25 is connected to main frame member 23 by a horizontally bonded rubber pivot assembly 27 (see FIGURE 5) in order that all the drive wheels may contact terrain even in the presence of irregularities.

Two drive wheels 29 and 30 arranged to swivel together through 180° are provided proximate the corners of the free end of the main frame member 23, i.e., at the end remote from the pivot assembly 27. Two similarly swiveling wheels 31 and 32 are journaled to the short frame member 25.

The front drive wheels 31, 32 are driven by electric motor 35 (see FIGURE 5) and the rear wheels are driven by motor 37. Electric motive power for energizing the wheel drive motor is supplied by one or more batteries 39.

The transport vehicle is controlled by two hand manipulated control handles 41 and 43 shown in FIGURE 3. These handles are rotatable in a horizontal plane on the axis of stems 45 and 47, respectively, to independently manipulate the direction of the front pair of drive wheels and the rear pair of drive wheels. A servo system is provided so that each handle always points in the direction of its controlled pair of wheels. The handle grips 49 and 51 are rotatable to give independent forward or reverse and speed control to each set of drive wheels.

The means for the manipulation of the panel racks 11 and 13 is shown in FIGURES 2, 3 and 5. Hydraulic power is obtained by an electro-hydraulic system. A motor 53 drives a hydraulic pump 55. The racks are raised by hydraulic cylinders 57 when fluid under pressure is supplied by pump 55. Slide bobbin valve 59 of the type well known in the art is provided to maintain the rack in the raised position or to permit it to lower. Valve plunger 60 is mechanically linked to the hydraulic motor control switch 61 and to a hand control lever 63 as shown. When lever 63 is full forward, motor 53 is de-energized and valve 59 is open, thereby permitting the rack to be lowered. When lever 63 is pulled back a short distance, valve 59 is closed but the motor switch is still open, thereby permitting the rack to be maintained in the previously raised selected position. When lever 63 is moved full back, motor switch 61 is closed, and hydraulic pump 55 is driven, withdrawing fluid via tube 65 from reservoir 67' and forcing it via tubes 69 and 70 into hydraulic cylinder or cylinders 57. Ram 71 raises rack 11 through frame member 73 and 75 until the upward motion is stopped by limited upper position of the rack or until control lever 63 is moved forward to the half way position. When it is desired to lower rack 11, lever 63 is urged all the way forward, thereby opening valve 59 and permitting the fluid in the cylinder to flow back to the reservoir through tubes 70 and 77.

When both racks 11 and 13 are utilized, a single hydraulic pump and control system is sufficient for both for the reason that even if one rack is loaded more lightly than the other, the upward travel is limited by bracket 22 and, with this occurrence, the other rack will be elevated. A pressure relief valve 79 is present in connection with the hydraulic pump in a manner well known in the art to prevent damage if the motor is not de-energized at the instant the racks reach their uppermost allowed position.

The mounting details of the panel racks 11 and 13 are shown in FIGURES 2, 3 and 4. The stationary inclined supports or tracks 81 may be of any suitable material or configuration and in this embodiment these elements are elongated T-shaped structural members. The head of the T provides a convenient track for reentrant channel-shaped clips 83. At least two spaced apart clips are affixed as by welds to the back surface of the vertical members of panel racks 11 and 13. A stop or limit element 85 (see FIGURE 3) is welded to each of the tracks proximate the lower end to provide an automatic limit to the down travel of the panel racks. This limit occurs preferably when the foot pieces 17 have a small clearance above the delivery track floor, i.e., the plane of the bottom of the wheel tires. The panel racks 11 and 13 may be constructed of any structurally strong shape such as tubular, angle or channel, and in the embodiment shown these members are of right angular configuration.

The track elements are inclined inwardly from each lateral edge of the main frame member 23 and corresponding elements are fastened together at the meeting top ends as by welding together the opposed web portions. This construction permits the rack elements 11 and 13 to be slid into place on the track elements after fabrication. The building construction panel top limit stop and securing bracket 22 is bolted to the top ends of track elements 81 so that the panel rack can be inserted on the tracks after assembly into a unit.

To the end that the transport machine have the utmost in flexibility of motion, the rear pair and the front pair of wheels are independently driven. This flexibility is necessary particularly when unloading is done in a building under construction. At intersecting halls, one pair of wheels may be stationary or nearly so while the other wheels are pointed at right angles to the machine as part of the process of negotiating the intersection.

Although there are many types of mechanical drive mechanisms old in the transport art, the present application requires that each pair of wheels have a positive drive in any position which can be varied through 180°. Furthermore, the drive must be controllable with respect to speed and direction. In addition, it must be compact. These ends are accomplished by the combination of chain and bevel gear mechanisms.

For a description of the traction drive, reference is made to FIGURES 5, 6, 7 and 8. The front and rear wheel drive mechanisms are substantially identical, accordingly, only the rear mechanism is described in detail.

Each wheel is supported on a fork 101, the fork being an elongation of a tubular shaft 103. A radial bearing collar or plate 105 is affixed to the hollow shaft to provide a rotatable ball bearing thrust raceway. A stationary bearing member 107 has an elongated cylindrical portion which provides a freely moving bearing fit with shaft 103 and a radial collar portion 109 which provides an upper ball bearing thrust raceway, and attaching ears 111. The ears 111 are provided with bolt holes (not shown) to permit the wheel assembly to be affixed to the main frame bottom plate 113 by bolts 115.

The traction drive is from sprocket 117 to shaft 119 to bevel gear combination 121 to sprocket 123 and to wheel sprocket 125. Sprocket 117 is affixed to vertical pinion shaft 119 as by set screw 133. Pinion shaft 119 is journaled in bearing block 134 which in turn is secured within fork shaft cylindrical portion 103. Pinion 135 is further held from endwise motion by collar 137 locked to shaft 119.

Pinion 139 is secured to transverse pinion shaft 141 and is journaled in a bearing 143 radially affixed to fork shaft 103. The small sprocket 123 is non-rotatably affixed to the outer portion of pinion shaft 141.

Large sprocket 125 is non-rotatably affixed to wheel axle 145. Each drive wheel (in this case wheel 29) is keyed or otherwise non-rotatably affixed to its axle shaft. Sprockets 123 and 125 are in alignment to properly co-operate with drive chain 147.

Both wheels of each pair are coupled together by sprockets 117 and 117' and continuous drive chain 151. The drive motor 37 is mounted on the bottom plate 113 of main frame 23. Drive sprocket 153, mounted on the motor shaft, is in engagement with chain 151 to deliver the prime mover force for driving this pair of wheels.

Motor 37 is energized and controlled for forward and reverse, in a manner later to be explained, by means of the armature and field connections 155. Referring to FIGURE 8, the idlers 152 and 154 are provided to insure good driving engagement between sprocket 153 and chain 151.

The steering mechanism to be effective and convenient is subject to certain requirements. The wheels, because they are concealed from the operator, should always point in the direction indicated by the control handle. The steering drive must be positive, that is, it must not deviate because of uneven terrain or change in traction drive torque. Further, when a load of panels is being picked up, the fore and aft wheels must be in alignment with each other and transverse to the machine frame.

These ends are accomplished by a helical and worm gear drive, an electrical switch servo system and a transverse limit stop switch.

Referring to FIGURES 5 and 6, it is seen that the hollow shafts of the wheel forks of each pair of wheels is provided with steering drive chain sprockets 157, 157'. These sprockets are cooperatively engaged with the wheels in alignment by sprocket drive chain 159. A ring-shaped helical gear 161 is secured by any suitable spacer means from the nether side of sprocket 157. A worm gear 163 is non-rotatably affixed to the shaft of steering drive motor 167. Motor 167 is reversible but because the action is slow and self-limiting no speed control is provided.

Figure 10:
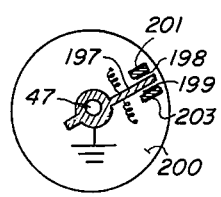
Figure 9:
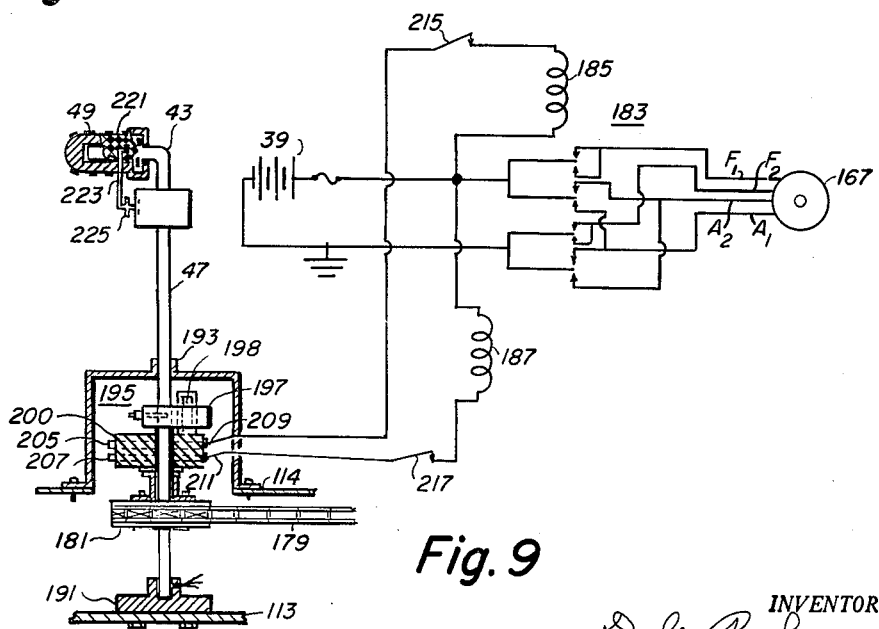
FIGURE 9 is a mechanical and schematic showing of the steering control system.

The steering servo control for the front wheels is explained with reference to FIGURES 5, 9 and 10. A driven sprocket 171 is meshed with chain 159'. Driven sprocket 171 is non-rotatably affixed to shaft 173 which is journaled in a bearing. Servo sprocket 177 is also affixed to shaft 173. Chain 179 engages sprocket 177 and connects the same with steering switch sprocket 181.

In order to facilitate the description of the servo-steering control system, the motor drive electrical system is first described with reference to FIGURE 9. Motor 167 is of the shunt type, so that reversing the interconnections between field and armature reverses the direction of rotation of the motor. $A_1$, $A_2$ are the armature leads and $F_1$, $F_2$ are the field leads. A four pole double throw normally open relay 183 having oppositely actuating energizing coils 185, 187 is utilized to effect right and left control. The function of the relay contacts is well known and it is only necessary for this explanation that it be understood that energizing the top relay coil 185 causes the motor to run in a direction which is left steering, and vice versa for the bottom coil 187.

The steering system for the rear end 23 of the machine is controlled by manual handle 43. Handle 43 comprises a vertical rotating shaft 47 which is journaled in a socket 191 affixed to bottom plate 113 of the main frame and a sleeve bearing 193 affixed to main frame upper plate 114. A single pole open center two-throw steering switch 195 is provided and is characterized in that steering either right or left is effected by applying a slight turning pressure on the control handle in the desired direction. Referring to FIGURE 10, it is seen that a radially elongated metallic contactor 197 is affixed to steering shaft 47. A pair of contacts 198 and 199 are circumferentially spaced apart a distance slightly greater than the thickness of the contactor. Contacts 198 and 199 are affixed as by embedding in a circular disc 200 of insulation material. Disc 200 has suitable upwardly extending protrusions 201, 203 which rigidly support contacts 198, 199. Disc 200 is rotatably supported about shaft 47 and contactor 197 is spring-biased to a center open circuit position between contacts 198, 199. Contactor 197 is grounded through shaft 47.

Disc 200 is also provided with electrical slip rings 205, 207 which connect, respectively, with contacts 198, 199 within the disc body. A pair of brushes 209, 211 connect slip rings 205, 207 (contacts 198, 199), respectively, to one end of each of relay actuating coils 185 and 187, respectively. The remaining connections of relays coils 185, 187 are electrically joined and connect to the ungrounded side of main energy source, battery 39. The other terminal of the battery is grounded, as is contactor 197.

Sprocket 181 has the same number of teeth as servo sprocket 177 (see FIGURE 5) and is affixed to circular switch disc 200. Consequently, it is seen that if the control handle is pressed leftwise, contact 198 is grounded, relay coil 185 is energized to establish a left turning operation in motor 167 which, in turn, through its helical gear 163 and annular ring gear 161, turns the wheels leftwise continuously until the pressure on handle 43 is released. While the wheels are being steered through an angle, servo sprocket 171 follows the movement and in turn causes steering switch sprocket 181 to follow the movement. Left pressure on handle 43 follows the movement which is terminated in the desired steering direction by releasing the left pressure on handle 43. The process for right hand directed motion is similar with the only requirement being that right pressure is applied to steering switch 195.

As mentioned previously, it is essential that when the wheels are turned transversely of the machine that the fore and aft pairs of wheels be parallel. To effect this end, right and left limit switches 215, 216 (shown in circuit in FIGURE 9) are provided to automatically stop further steering movement when the wheels are at right angles.

Figure 11:
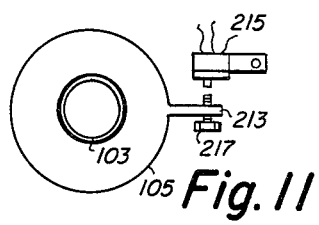
FIGURES 10 and 11 are additional details of the steering control system.

Referring to FIGURES 6 and 11, the right wheel lower raceway element 105 is provided with a radial lug 213. Thus, lug 213 turns with fork shaft 103. Mounted on the frame as by bolt 115 is a break contact switch 215. Switch 215 and lug 213 are shown in detail in FIGURE 11, and switch 215 maintains continuity at all times except when mechanically pressed by lug adjustable pressure screw 217. Left limit control is effected by left wheel mounting shaft lug 213 and stop limit switch 216. The lug adjusting screw 217 shown in FIGURE 11 permits the steering stop of the rear set of wheels and the stop of the front pairs of wheels to be similarly adjusted so that the wheels can track in parallelism when turned to the transverse position.

The steering control system for the rear set of wheels is similar to the system for the front wheels except that the sprocket 177 and remote servo chain 179 are not used. Referring to FIGURE 6 it is seen that switch servo sprocket 171' is in position to be directly mounted on control shaft 45 and it will, of course, be associated with an assembly otherwise identical with that shown in FIGURE 9.

Figure 13:
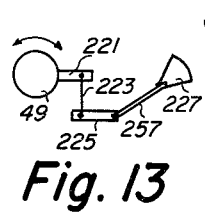
FIGURES 12 and 13 are mechanical and electrical schematic details of the traction motor controls.
Figure 12:
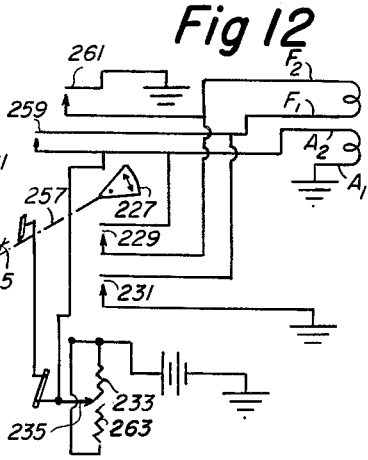

Referring to FIGURES 3, 12 and 13, it is seen that each of the traction drive motors has its control circuitry in a box in mechanical association with rotatable grip handles 49, 51. Referring specifically to FIGURES 9 and 13 at the moment for details of the mechanical linkage, it is seen that handle grip 49 has a projecting crank arm 221. Arm 221 is linked by rod 223 to a crank arm 225 affixed to switch cam shaft 257. FIGURE 12 shows the circuitry details.

If handle 49 is turned counterclockwise a small fraction of a revolution, handle crank arm 221 moves upward and turns cam arm 225 clockwise. This turns cam shaft 257 clockwise and results in the clockwise and downward motion of the lobe of cam 227. The cam lobe closes contacts 229 and 231 and at the same time moves speed control rheostat slider 235 onto resistance 263. As the control handle is progressively rotated the resistance is decreased and the motor speed increased. If shunt field control rather than series control were used the rheostat resistance would be full out on initial contact and would be increased for increased speed. The right rotation of handle 49 is arbitrarily selected to result in forward rotation of the corresponding wheels. In this position, field leads $F_1$ and $F_2$ are respectively connected with armature leads $A_1$ and $A_2$. Left rotation of the control handle connects field leads $F_1$ and $F_2$ respectively with armature leads $A_2$ and $A_1$. The middle position of the control handle is "off." Although this explanation has been made with respect to control handle 49, an exactly similar system is provided for the other pair of wheels controlled by handle 51.

The transport vehicle of the present invention is intended to carry its operator and for the purpose, step or tread 128 is provided. Tread 128 is preferably hingedly affixed to riser 130 which in turn is attached to the vehicle rear base portion as shown in FIGURE 1.

Various changes may be made in the embodiment of the invention hereinbefore described, without departing from or sacrificing the advantages of the invention as defined in the appended claims.

Having described our invention what we claim is:

1. A motorized vehicle for transporting panel cargo comprising an elongated chassis, independently steerable and driven pairs of wheels at the forward and rear ends of said chassis, panel rack means vertically slidably supported on the elongated edges of said chassis and adapted to be lowered to pick up cargo when said chassis is moved laterally, and to transport said cargo when said rack is elevated and the chassis is propelled in a longitudinal or curved path, each of the wheels being journaled in the end of a vertical cylindrical column, bearing means attaching the column for horizontal rotation to a corner of the chassis, a shaft supported in axial alignment in the column, a radial shaft supported in the column in alignment with the wheel journal, right angle gear means cooperatively engaging the lower end of the axial shaft with the inner end of the radial shaft, a sprocket mounted on the exterior end of the radial shaft, a sprocket non-rotatably affixed to the wheel in alignment with the radial shaft sprocket, whereby rotational power applied to the upper end of the axial shaft rotates the radial shaft sprocket regardless of the steering orientation of the wheel, a drive chain connecting the radial shaft sprocket with the wheel sprocket, a traction drive motor and a steering drive motor provided for and supported on each end of the chassis, means mechanically connecting the axial shafts of the two wheel and column assemblies at each end of the vehicle for synchronized rotation, mechanical coupling means connecting the traction drive motor to said axial shafts for torque delivery thereto, means mechanically coupling the upper ends of said columns for synchronized steering of the wheels at the said each end of the vehicle, means mechanically connecting the steering drive motor to the columns, a steering and traction controller means for the front pair of wheels and a steering and traction controller means for the rear pair of wheels, said controller means each comprising a vertical column shaft and a substantially horizontal control handle rotatably supported on the upper end of the column shaft, said column shafts being rotatably supported on the rear end of the chassis in side by side relationship, a sprocket and a switch disc affixed to one another and rotatably supported on a lower portion of each of the vertical column shafts, a driven and a driving sprocket supported on a vertical shaft on the front portion of the vehicle with the driven sprocket in engagement with the means mechanically coupling the upper ends of the columns for synchronized steering, the driving sprocket and the sprocket connected to the switch disc being coupled together by a chain whereby steering motion of the front wheels causes corresponding motion of the switch disc, a pair of electrical contacts arcuately spaced apart on a peripheral portion of a lateral face of the disc and supported at right angles to the disc to provide opposed contact elements, a contactor arm affixed to the control column shaft and extending between said contacts, means biasing said contact arm to a midposition between the contacts whereby steering motion of the front wheels is accompanied by rotation of the control handle on the steering control column.

2. The vehicle of claim 1 in which said steering drive motor is reversible, a relay switch having double pole contacts for left steering and double pole contacts for right steering, an actuating coil for each of said double pole contacts, said left steering actuating coil being connected to the disc contact counterclockwise of the contactor arm and the right steering actuating coil being connected to the other disc contact, whereby left steering pressure on the front wheel steering handle causes left steering rotation of the front wheel supporting columns and corresponding rotation of the front wheel steering control handle, and vice versa action as a result of right steering pressure on the front wheel steering control handle.

3. The vehicle of claim 2 in which a contactor disc is affixed to a sprocket and means rotatably supporting the disc and sprocket in proximity with the means coupling the upper ends of the wheel supporting columns at the rear end of the chassis, means engaging said sprocket with said coupling means, and a right hand steering and a left hand steering contact on said disc associated with a relay switch, steering control handle and steering motor in an association similar with that for the front end of the vehicle whereby said front wheels and the rear wheels are independently power steered and the corresponding control handle points in the direction of motion of its pair of wheels.

4. The vehicle of claim 3 in which the traction motors have direction and speed control, said speed control being a rheostat and said direction control being a cam operated connecting and reversing switch, a rotatable handle grip rotatably supported on the handle portion of the steering column shaft, means mechanically linking the handle grip with the switch cam and with the rheostat resistance element, said rheostat having two resistances in arcuate relationship and being spaced to provide an open circuit center position, said rheostat having a contacting slider and said cam operated switch having a contact actuating cam having a neutral position between opposite drive direction controlling contacts, means linking the rheostat and the cam with the rheostat in neutral position when the cam is in neutral position, whereby said control handle has a neutral turning position and counterclockwise rotation establishes contact for one direction of traction drive and rotation in the clockwise direction causes traction drive in the opposite direction and progressive rotation of the control in the selected direction adjusts the velocity of the vehicle.

5. The vehicle of claim 4 in which limit switches are in series with the steering relay actuating coils, said limit switches being mounted adjacent the wheel support columns and lugs affixed to the wheel support columns open circuit, said relay actuating coil circuits when the wheels are turned to right angles, substantially, to the direction of elongation of the chassis.

6. The vehicle of claim 5 in which said elongated chassis is in two portions, a rear portion and a front portion, said front portion being short compared to the rear portion, a horizontal journal joining said portions and means resiliently biassing said journal to a condition of plane symmetry of the two portions of the chassis.

7. The vehicle of claim 6 in which an operator's platform is provided, said platform having a tread portion and a riser, said riser having a vertical height of approximately three fourths of the distance between the bottom of the wheels and the top surface of the chassis, means securing the upper portion of the riser to the chassis rear edge.

References Cited in the file of this patent
UNITED STATES PATENTS

| | | |
|---|---|---|
| 1,953,056 | Olen | Mar. 27, 1934 |
| 2,828,870 | Corley | Apr. 1, 1958 |
| 2,842,376 | Krilanovich | July 8, 1958 |
| 2,915,319 | Kumler et al. | Dec. 1, 1959 |
| 3,018,116 | Summers et al. | Jan. 23, 1962 |